United States Patent [19]

Leeson et al.

[11] 4,072,799
[45] Feb. 7, 1978

[54] VENT PLUG SYSTEM FOR BATTERIES

[75] Inventors: Jeffrey S. Leeson, South Euclid; Joseph F. Szabo, North Olmsted, both of Ohio

[73] Assignee: ESB Incorporated, Philadelphia, Pa.

[21] Appl. No.: 787,020

[22] Filed: Apr. 13, 1977

[51] Int. Cl.$^2$ .............................................. H01M 2/12
[52] U.S. Cl. ........................................ 429/82; 429/89
[58] Field of Search ...................... 429/89, 82, 84, 72, 429/76; 220/367, 373; 431/356

[56] References Cited

U.S. PATENT DOCUMENTS

| 2,240,461 | 4/1941 | Riggs et al. | 429/76 |
| 3,944,437 | 3/1976 | Auerbach | 429/82 |

Primary Examiner—Anthony Skapars
Attorney, Agent, or Firm—Gary V. Pack; Gilbert W. Rudman; Anthony J. Rossi

[57] ABSTRACT

A vent system for an electric storage battery designed to remove the electrolyte which is entrained in the gases that are vented from the particular battery cell to the atmosphere through the vent plug assembly. The liquid gas separation feature has a primary inlet on the sidewall of the vent plug at its uppermost position that still remains in the battery cell, a drain opening in the lowermost portion of the vent plug, and baffles arranged inside the vent plug assembly such that the fluid entering the primary inlet flows in a horizontal direction and is scrubbed to remove the electrolyte. The electrolyte is then collected and returns to the cell through the drain opening while the scrubbed gases eventually reach the atmosphere. The liquid gas separation system can be used in a vent plug having a low profile for use on maintenance free batteries as well as on non-maintenance free batteries.

19 Claims, 9 Drawing Figures

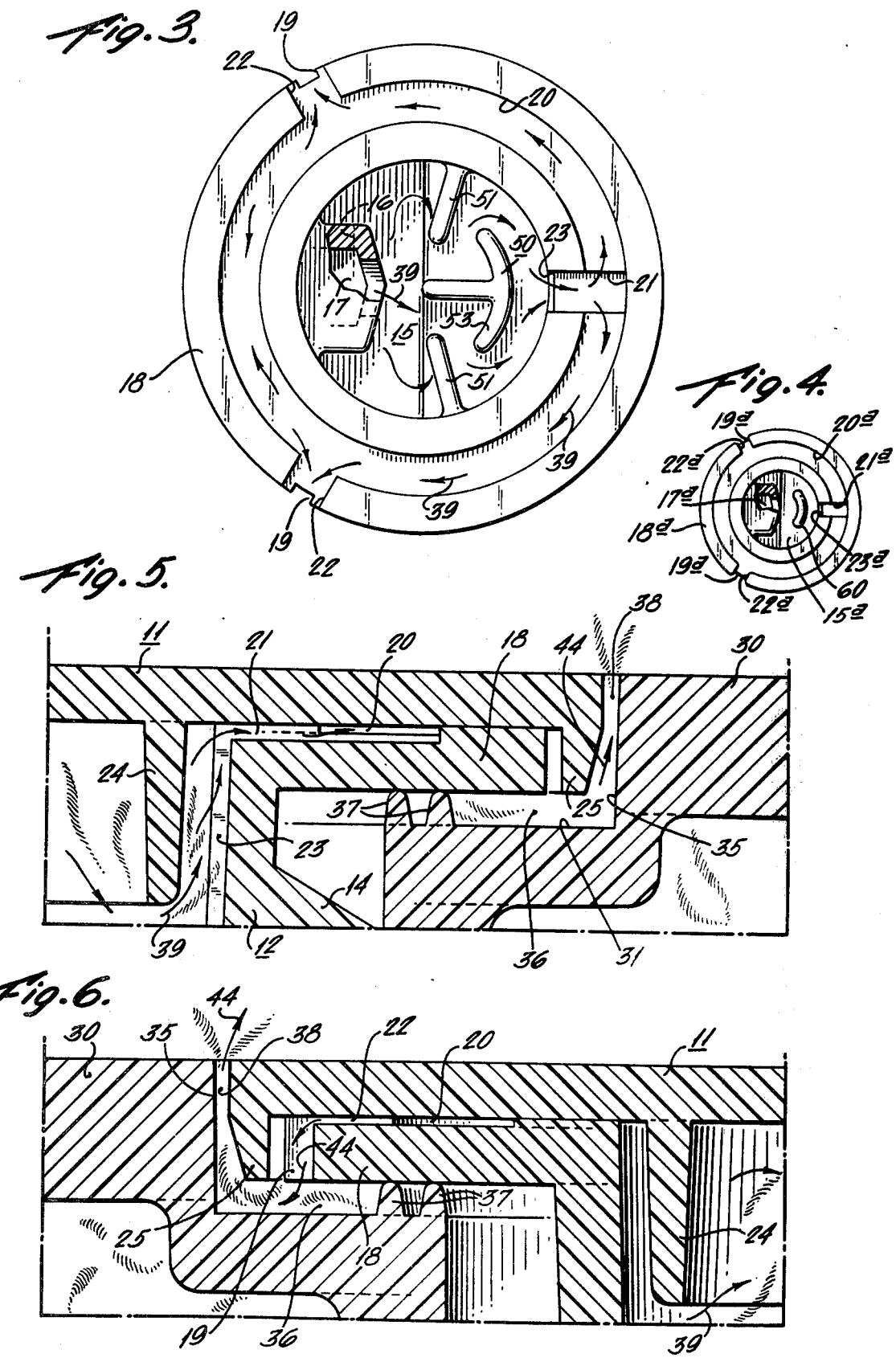

VENT PLUG SYSTEM FOR BATTERIES

CROSS REFERENCE TO RELATED APPLICATIONS

This application includes claims for the electrolyte separation system and is related to two copending patent applications, one entitled, "Vent System with Flame Arresting Capabilities," by Joseph F. Szabo Ser. No. 787,018, and a second one entitled, "Vent System with Flame Arresting Capabilities," by Albert L. Fox, Joseph F. Szabo, and Jeffrey S. Leeson Ser. No. 787,019, both filed of even date herewith. The former copending application relates to the design of the first embodiment of the flame arresting system for the disclosed vent plug system, and the latter copending application includes claims directed at the second embodiment of the flame arresting system.

BACKGROUND OF THE INVENTION

This invention relates to a vent system for an electric storage battery, and more specifically to a vent plug system which is designed to separate the entrained electrolyte from gases which are vented from the battery cells to the atmosphere through the vent plug.

In reading the following disclosure, it should be noted that the invention disclosed and claimed herein, and the discussion concerning it, are applicable to many kinds of battery systems, and that the references to applications in the area of automotive batteries and maintenance free automotive batteries are made to illustrate possible uses of the invention and not for the purpose of limiting the scope of the claimed invention.

When designing a vent plug for use with a maintenance free battery, there are several important considerations. Ideally, a maintenance free battery is designed so that throughout its normal life, no service is required, such as the addition of water to the battery cells. Since most maintenance free batteries do consume some water, the battery design is such that a sufficient reserve of electrolyte is provided by having the liquid level of the electrolyte as high as possible in a new battery.

The requirement for a high electrolyte liquid level imposes new limitations on a design for a vent plug. One limitation is that the physical size of the vent plug is restricted so that the distance the vent plug extends into the vent well of a particular cell is minimized, thereby allowing a maximum liquid level height. Second, the vent plug should be designed so that in the event the electrolyte liquid level rises to a point where the bottom of the vent plug is in contact with the electrolyte, any pressure which may develop in the particular battery cell can still be relieved.

One method of further reducing the amount of electrolyte or water loss during the operation of the battery, is to scrub the fluid that is vented so that the gaseous phase and the liquid phase are separated and the liquid phase is returned to the individual cell. Failure to do otherwise may result in a maintenance free battery with a potentially shorter life due to excessive loss of electrolyte as well as acid contamination of the outside of the battery.

Designing a vent plug which will meet these considerations is further complicated when marketing requirements demand that the vent plugs not extend above the upper surface of the battery cover so that the battery is aesthetically pleasing to the consumer and has the appearance of a maintenance free battery. The resulting design for such a vent plug must therefore have a low profile, with an efficient liquid gas separation system designed to operate properly even though the liquid level of the electrolyte has risen enough to cover the bottom portion of the vent plug.

SUMMARY OF THE INVENTION

In accordance with a preferred embodiment, an improved vent system is disclosed which meets the above noted considerations for a battery venting system. The venting system includes a vent plug assembly having a cylindrically shaped body section which extends into the vent plug well, an inclined bottom across the bottom of the body section, and apertures located in the bottom section as well as in the side wall of the body section serving as drain openings and inlet openings, respectively. The inlet opening is designed so that the fluid flow into the vent plug enclosure is in a horizontal direction and vertical baffles are provided to deflect the flow of fluid so that a scrubbing effect takes place to separate the liquid and gaseous phases. The gases then escape through the upper portion of the vent plug and the collected liquid is returned to the cell through the drain openings.

Two vent plug embodiments are illustrated using the same liquid-gas separation system with a first embodiment designed for insertion into a modified vent plug well so that the top of the vent plug is flush with the top of the battery cover. The second embodiment is designed for use on a conventional battery cover, however, the vent plug extends above the top of the battery cover in this embodiment. The basic liquid-gas separation system remains the same for both embodiments. In addition, an alternate embodiment of the gas-liquid separation system is disclosed for use in vent plugs which are too small to be molded with the structure of the larger vent plug.

By using separate inlet and drain openings in the vent plug, improved battery performance is provided. First of all, the battery can be produced with the electrolyte at its highest possible level for the particular battery design, thereby maximizing the total life of the battery. Another feature is that in the event the electrolyte liquid level rises to the point that it covers the drain openings, assuming that the inlet openings are higher than the drain openings, release of fluid from the cell is permitted through the inlet opening, and the operation of the gas-liquid separation system is not inhibited since the liquid electrolyte can return to the cell through the drain opening. Using a horizontal fluid flow direction and vertical baffles permits the total height of the vent plug to be reduced since the liquid-gas separation does not take place in a vertical direction. This feature also acts to enable the bottom of the vent plug to be as high as possible in the individual battery cell so that the electrolyte liquid level can be maximized. In addition, the marketing considerations of a recessed vent plug are provided to give the appearance of a maintenance free battery while still permitting access to the battery cells for testing purposes or in the event of vehicle electrical system malfunction.

The net result of these advantages is a safer, more attractive vent system for an automotive battery or other battery, which also acts to enable the potential life of a given battery to be maximized.

A better understanding of the invention and its advantages can be seen in the following description of the drawings and preferred embodiments.

DESCRIPTIONS OF THE DRAWINGS AND PREFERRED EMBODIMENTS

FIG. 3 is a horizontal section taken along the line 3—3 of the vent plug in FIG. 2, with the vent plug cap (11) removed, showing the internal structure of the vent plug.

FIG. 4 is a horizontal section of the vent plug with an alternate design of the liquid-gas separation system.

FIG. 5 is a section taken along the line 5—5 in FIG. 1.

FIG. 6 is a section taken along the line 6—6 in FIG. 1.

For the purpose of describing various aspects of the invention, the flame arresting features will be discussed first and then the liquid-gas separation system inside the vent plug assembly will be discussed.

FLAME ARRESTING FEATURES

Figure 1:
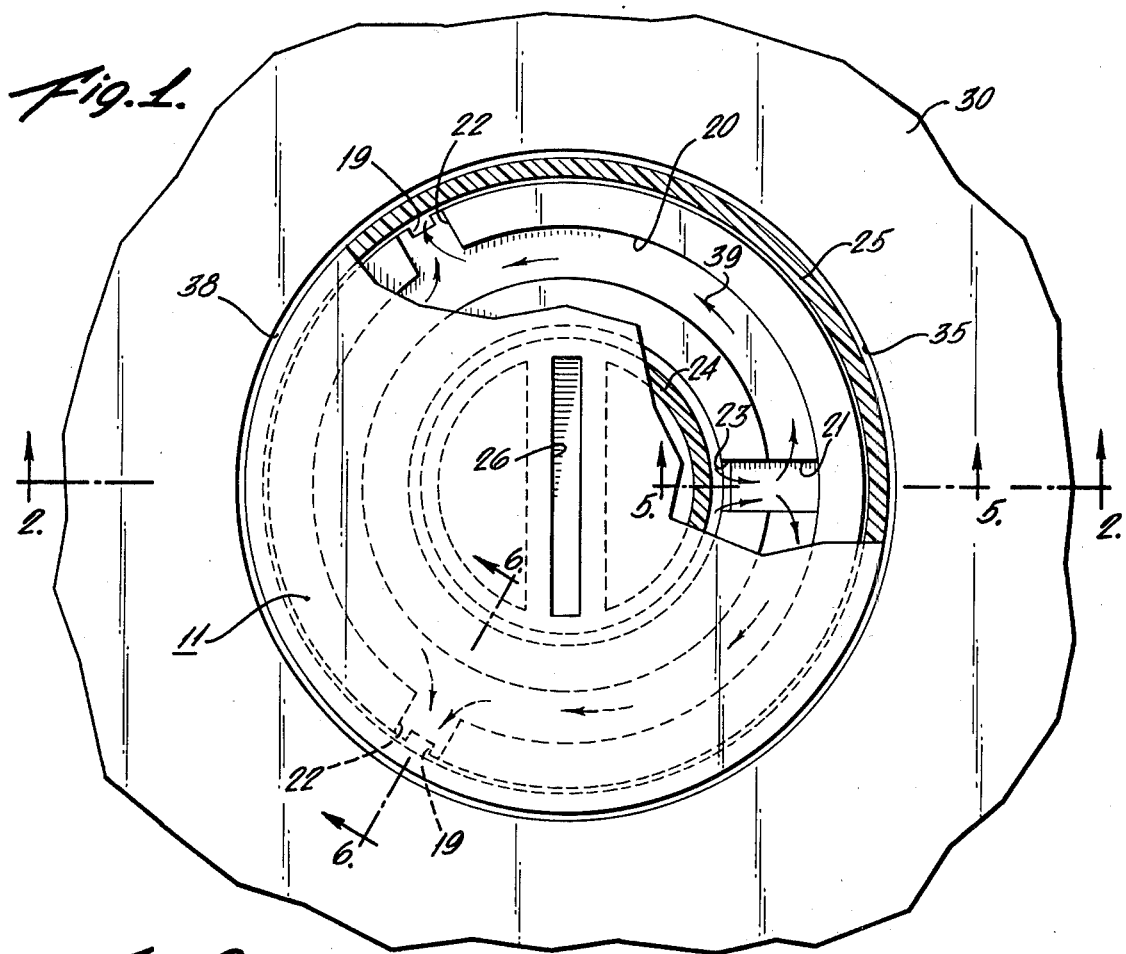
FIG. 1 is a top view having a partial section of the vent plug assembly of the first embodiment inserted in a modified vent well.
Figure 2:
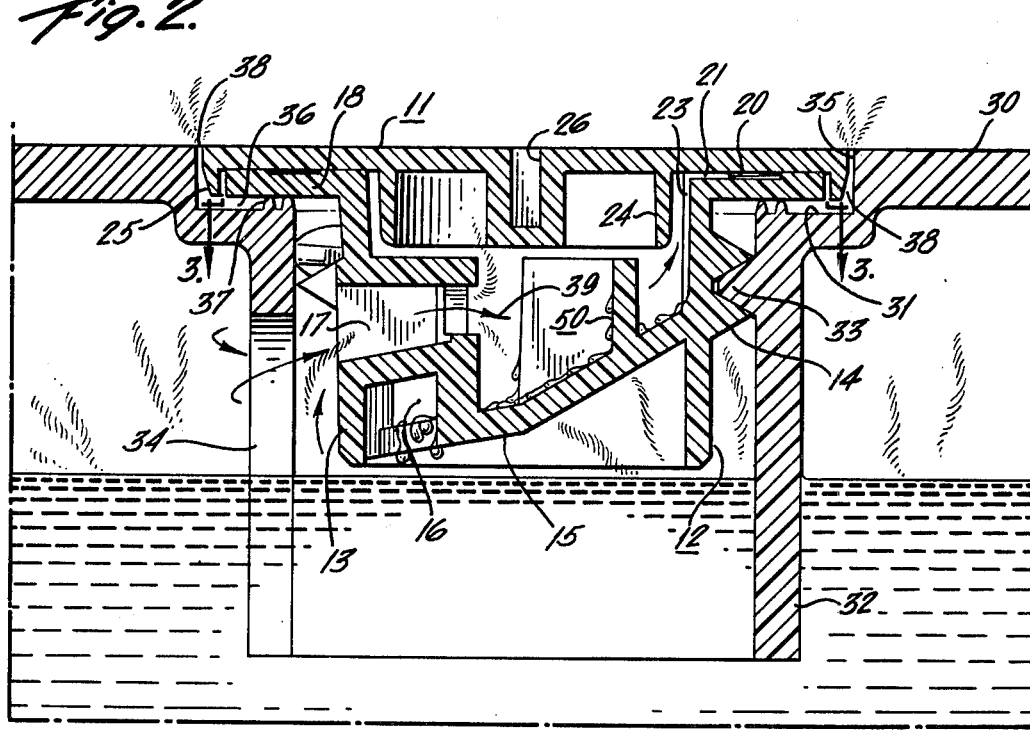
FIG. 2 is the full vertical section through the center of the vent system of FIG. 1.

Referring to FIGS. 1-7, which illustrate the first embodiment flame arresting features, the vent plug assembly can be assembled from two sections, cap 11 and base 12. As can be seen in FIG. 2, base 12 includes a cylindrical body portion 13 with threads 14 formed along its outside surface. A slanted bottom portion 15 is provided with two drain openings 16. (Only one drain opening 16 is shown in the drawings, with the other drain opening being located directly opposite the one illustrated, in a symmetrical manner.) An inlet opening 17 is provided on the sidewall of body portion 13. The upper portion of body portion 13 has an outwardly extending flange portion 18, over which cap 11 fits. Notches 19, located on the outer edge of flange 18, cooperate with the outer skirt of cap 11 to provide exhaust ports for the vent plug assembly which direct the flow of vented gases downwardly. A restricted passage connects the inside enclosure of body portion 13 to notches 19 and serves to prevent transmission of a flame into the vent plug. This restricted passage includes circular recess 20 in the upper section of flange portion 18, with radially extending recesses 21 and 22 extending from recess 20 for connecting it to the inside of body portion 13 and notches 19, respectively (see FIG. 3). The thickness of this restricted passage is selected to be narrow enough to prevent the passage of flame therethrough. In addition, a vertical recess 23 is provided on the inside wall of cylindrical section 13, for reasons which will become apparent later.

Cap 11 has a flat upper surface, which remains flush with the top of the battery cover, and inner and outer, downwardly extending skirts. Inner skirt 24 is designed to fit fairly close to the inside wall of body portion 13 and outer skirt 25 is designed to fit fairly close around the outside lateral side of flange section 18. Since most of the non-recessed area on the upper portion of flange portion 18 is used to seal cap 11 to base 12, fluid flow through flange portion 18 is restricted to the recessed area (restricted passage), as will be more thoroughly discussed below.

The distinction between the first embodiment and the second embodiment lies in the amount outer skirt 25 extends down below the bottom level of flange portion 18. In the first embodiment, the lower edge of outer skirt 25 is essentially flush with the bottom level of flange portion 18. However, the lower edge of outer skirt 25 extends somewhat below flange portion 18 in the second embodiment. The two designs are required since the first embodiment is designed for use primarily on a maintenance free battery with the vent plug top being flush with the top of the battery cover and the second embodiment is designed for use with a battery having a conventional cover and vent well design, wherein the vent plugs can be routinely removed to examine the electrolyte level in each cell.

A slot 26 is molded into cap 11 to facilitate easy removal of the flush mounted vent plugs of the first embodiment, whereby the internal cells of the maintenance free battery can be reached for testing or in the event of vehicle electrical system malfunction.

The flame arresting function of the vent plug assembly is accomplished in conjunction with the battery cover design. For the first embodiment, referring to FIG. 2, the battery cover 30 has a vent well with a recessed, circular shoulder 31 for receiving flange portion 18 of the vent plug assembly, and a bore defined by sidewall 32 having threads 33 on its inside surface, for receiving body portion 13 and securing the vent plug assembly in the vent well. In the event the electrolyte level is above the lower portion of sidewall 32, breather slot 34 prevents the build-up of gas pressures in the upper portion of a cell around sidewall 32 by allowing the gases to reach the vent plug for relief.

As can be seen in FIG. 2, an explosion chamber is formed in annular space 36 formed between shoulder 31 and upper sidewall 35, and the outside edge of outer skirt 25 of cap 11 and flange portion 18. The particular size of this explosion chamber is determined by the vertical clearance between shoulder 31 and flange portion 18. Two annular seal rings 37 along the upper surface of shoulder 31 maintain this desired vertical clearance and also act as a seal, as can be seen in FIG. 2. In addition, the outside diameter of shoulder 31 is selected such that the annular space between sidewall 35 and the lateral edge of cap 11 forms a narrow, annular opening 38 through which the gases are ultimately vented to the atmosphere. Preferably, the width of annular opening 38 is large enough to permit the passage of a flame therethrough, so that ignition of the gases in the explosion chamber takes place upon ignition of the gases entering the atmosphere. Another factor in selecting the size of annular opening 38 is that it allow the force of the controlled explosion to be directed to the atmosphere, thereby reducing the forces that must be withstood by the vent well and the vent plug. The net result is that usually the vent plug and vent well sustain little or no damage and can continue to function in their normal manner.

During normal operation of the battery, especially when the battery is being charged, the gases produced from the chemical reactions taking place inside the battery rise to the top of the cells and enter the vent plug assembly through inlet opening 17, and possibly through drain openings 16. Eventually the gases flow through the plug enclosure and into the annular space between the inside sidewall of body portion 13 and inner skirt 24 of cap 11, eventually reaching notches 19 through the restricted passage defined by recesses 23, 21, 20 and 22, as is illustrated by arrows 39. However, because of the placement of the vent plug assembly within the modified vent well, the vented gases must pass through annular space 36 before entering the atmosphere at annular opening 38.

In the event a spark should occur near the gases being vented at opening 38, and combustion results, the potential for exploding the battery could be very real. However, the flame proceeds into annular space 36, where its progress is stopped by the restricted passage. The resulting rapid expansion of the gases in the explosion chamber causes a controlled explosion to take place, thereby extinguishing the flame. The pressure from the controlled explosion is relieved to atmosphere through annular opening 38, thereby minimizing the amount of harm to the vent plug assembly and battery cover. The potentially dangerous situation has now been completely eliminated.

Furthermore, a backup flame arresting means can be provided such that in the event a flame reaches the space between cap 11 and the upper surface of flange 18, cap 11 will melt if it is made from material with a low melting point, thereby extinguishing the flame.

By way of example, and not for limitation, the following dimensions of a typical vent system are provided. In a vent plug with a cap diameter of 3.15 cm, a typical horizontal cross sectional size for notches 19 could range from 0.71 to 1.23mm$^2$ each, with the volume of the explosion chamber, annular space 36, ranging from 0.19 to 0.65 cm$^3$. Annular opening 38 between the edge of cap 11 and sidewall 35 can have a radial width of approximately 0.25 to 0.51 mm., forming an average cross sectional area of 2.5 to 5.62 mm$^2$. The cross-sectional area of the internal, restricted passage (recesses 20, 21, 22 and 23) can range from 0.187 to 0.271 mm$^2$, with a thickness ranging from 0.076mm to 0.18mm.

Several tests have been conducted in accordance with the guidelines established by Battery Council International to prove the feasibility of this vent system design. In one test, several vent systems, vent plugs properly secured in their respective modified vent wells, were connected to a flow of gas generated from a 12 volt lead-acid automobile battery being overcharged at up to 40 amps. Sparks were created near the point of gas discharge (annular opening 38), causing a small explosion at each spark ignition. No propagation of the flame through the vent plug took place in 25 separate spark ignitions of the vented gas, thereby indicating a battery explosion was avoided each time.

A second set of tests were conducted under the same test conditions with vent plugs having restricted passages with different thicknesses. With restricted passage thicknesses ranging from 0.076mm to 0.152mm, 85% of the ignitions resulted in harmless controlled explosions. However, with a restricted passage thickness above 0.18mm, the controlled explosion rate fell to 35% of the total ignitions.

It should also be noted that the size of the explosion chamber may be easily adjusted by making shoulder 31 deeper, increasing the height of sealing rings 37, or adding a washer between rings 37 and flange portion 18.

The vent system with the second embodiment flame arresting system utilizes the same flame arresting concepts of the first embodiment, but can be used without modifying the conventional battery cover design. This embodiment is illustrated in FIGS. 8 and 9 wherein the features like those shown for the first embodiment are labeled with the same numeral bearing a prime designation.

A conventional automotive lead-acid battery is housed in a container with a cover having vent plug wells for each respective cell of the battery. The particular vent plug well used for illustrative purposes is shown in FIG. 8 having threads 41 located around its inside surface, with a chimney 42 extending above the top of cover 30'.

Figure 7:
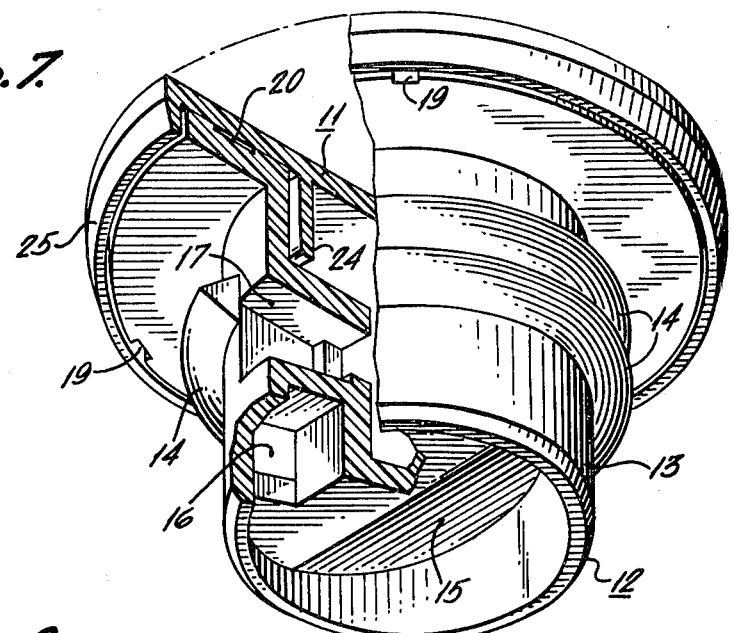
FIG. 7 is an elevational view of the vent plug assembly for the first embodiment.
Figure 8:
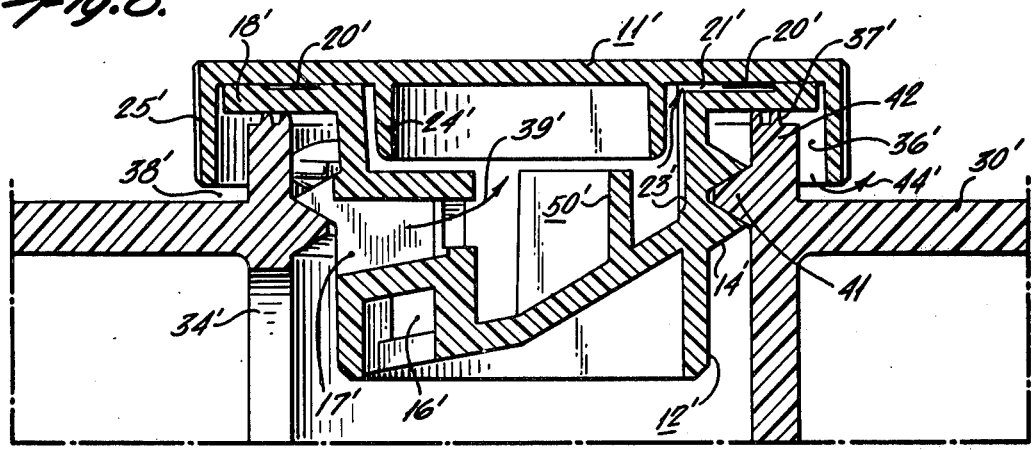
FIG. 8 is a vertical section through the center of the vent plug assembly having the second embodiment flame arresting system, fully inserted in a vent well of a conventional battery cover.
Figure 9:
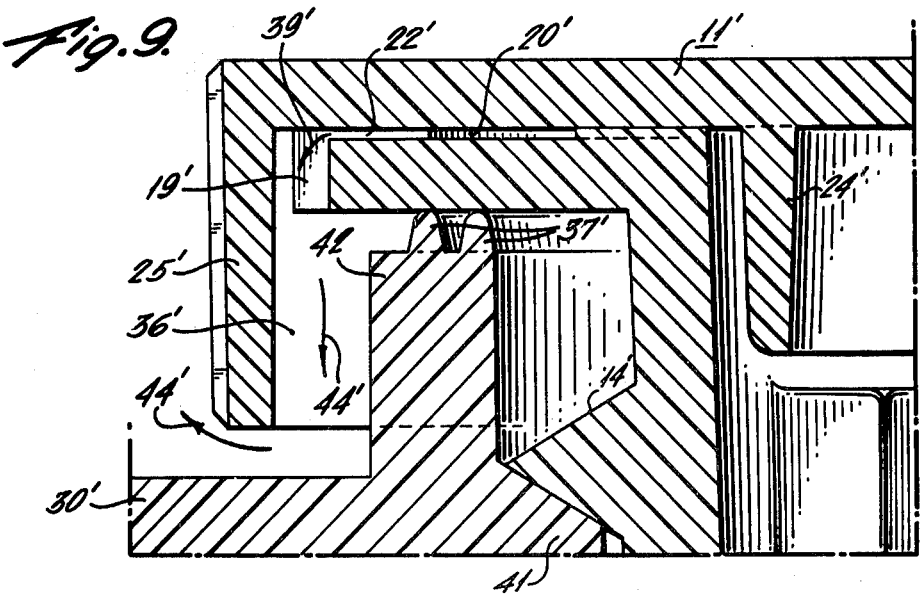
FIG. 9 is an enlarged section taken from FIG. 8.

In order to provide this flame arresting ability, the vent plug assembly of the first embodiment is modified by extending outer skirt 25 of cap 11 down below flange portion 18 a predetermined distance to form extended outerskirt 25', as shown in FIGS. 7 and 8. As can be seen in these FIGURES, an annular space 36' is created between the outside surface of chimney 42 and the top of cover 30', and the inside surface of outer skirt 25' and the lower surface of flange portion 18' thereby forming the explosion chamber for the second embodiment.

The basic operation of the vent system of the second embodiment remains nearly the same as that in the first embodiment. As gases (see FIG. 9) rise in the individual cells of the battery, they enter their respective vent plug enclosures through openings 16 and 17. The gases eventually reach annular space 36', as discussed above, and flow into the atmosphere through annular opening 38' (see arrows 44'), which is bounded at the top of cover 30' and lower edge of outer skirt 25'.

The basic dimensions of the modified vent plug remain the same as that provided above for the vent plug used in the first embodiment. However, in the modified vent plug, outer skirt 25' can extend approximately 0.48 to 0.49 cm below the lower surface of flange portion 18', with the end of skirt 25' being approximately 0.76 to 0.77 mm. above cover 30'.

Results from tests conducted on this embodiment according to procedures similar to that discussed above for the first embodiment have indicated that the vent system of the second embodiment is nearly as effective, and still provides meaningful protection from battery explosions caused from external ignition of the vented gases.

In addition to the above embodiments of the flame arresting systems, other variations of the battery cover and vent plug designs can be made to provide a flame arresting system operating on the same principles. For instance, the battery cover could be molded to have a skirt extending above the battery cover, which would serve the function of sidewall 35 in the first embodiment, or skirt 25' in the second embodiment. The discharge port (38) would then be the annular space between the upper end of this skirt and the lateral side of cap 11.

LIQUID-GAS SEPARATION

Another important function of a vent system is to separate the liquid electrolyte that is combined with the gases that are vented through the vent plug, so as to make the most efficient use possible of the available electrolyte in a given battery. This is especially important since maintenance free batteries are by name designed so as to not require the addition of electrolyte or water to the electrolyte throughout the life of the battery. Use of a vent cap which removes any electrolyte from the escaping gases produced from the internal chemical reactions of the battery, helps to reduce the total consumption of electrolyte throughout a battery's life, and also reduces contamination of the top of the battery. Another consideration for a maintenance free battery is that the individual cells of a battery are filled as full as possible to provide the longest battery life possible. Design problems for such a vent plug are further complicated by the marketing requirement that the vent plugs not extend above the top of the battery cover. Therefore, a vent plug assembly which meets these requirements, by necessity, must have a low profile.

Referring to FIGS. 2 and 3, "T" shaped baffle 50 extends upward from bottom portion 15 directly in front of inlet 17. Diagonal baffles 51 extend from the internal sidewall of body portion 13 and also from bottom portion 15 on either side of "T" shaped baffle 50. Baffles 50 and 51 are arranged with respect to each other, inlet 17, and drain openings 16 such that nearly all of the flowing gases are diverted to provide maximum surface contact between the fluid entering the vent plug assembly and the baffles, thereby providing maximum separation of the gases and the liquids. This effect is further aided by the close tolerance between inner skirt 24 of cap 11 and the inside surface of body portion 13.

More specifically, when gases are being produced by the internal chemical reactions in the battery, gases combined with liquid electrolyte are forced into the vent plug assembly through inlet opening 17, and possibly drain openings 16, as indicated by arrows 39. A large amount of the fluid entering the vent plug assembly enters through inlet 17 and begins flowing in a horizontal direction. Preferably, inlet 17 includes a horizontal elongated passage, so as to assure a horizontal flow direction is obtained. The fluid flow travels between the non-attached ends of diagonal baffles 51 along either side of "T" shaped baffle 50 before contacting arms 53 extending from baffle 50. The flowing stream now becomes diffused and swirls around between the baffles before eventually leaving the vent plug enclosure through vertical recess 23. In the process of seeking an exit from the vent plug enclosure, the contact of the fluid stream with the baffles and the internal surfaces of the enclosure produces a scrubbing effect which causes most of the liquid phase in the stream to settle out and flow down bottom portion 15 until it reaches drain opening 16 and returns to the cell below. The gaseous phase continues to flow to the atmosphere, as discussed above, through restricted passages 20, 21 and 22, notches 19, annular space 36 and annular opening 38.

Under most conditions, some gas flow into the vent plug assembly will take place through drain openings 16, but this has little effect on the flow of liquid from vent plug enclosure. In the event the liquid level of the electrolyte should rise sufficiently to reach the lower portion of the vent plug, thereby blocking drain openings 16, relief is still permitted through inlet 17 which is above drain opening 16. As a result, the possibility of building up excessive pressure in a battery cell because of blockage of a vent plug inlet by electrolyte is effectively reduced. A wider safety margin for electrolyte level is thereby produced for the designers of the maintenance free battery.

An alternate design for the liquid-gas separation system is illustrated in FIG. 4, wherein the same elements are identified by the same numeral bearing the letter "a" designation. This alternate design has a different baffle structure for use in small vent plugs for small batteries, which may be used in compact cars, on motorcycles and other low power applications. In place of baffles 50 and 51, one curved baffle 60 is located across from inlet opening 17a, and operates in a manner similar to that discussed above to separate the liquid and gas phases.

This separation system for a vent plug provides an efficient system for reducing the loss of electrolyte, one which can be constructed in a low profile arrangement because the separation takes place in a horizontal direction, thereby eliminating the need for a series of horizontal baffles opposing the vertical flow direction which inherently can take up more space. An additional safety margin, as well as added life, is produced by enabling vapors to be relieved at the uppermost point in each cell. The combination of the low profile separation system with the flame arrestor system of the first embodiment provides a safe, reliable, and efficient vent system for a battery, with an external appearance which is also aesthetically pleasing for marketing purposes.

Furthermore, the same principals are utilized in the vent system of the second embodiment to enable its use on a battery having a conventional vent well design.

For purposes of assembling the two vent plug sections, cap 11 and base 12, any commonly available method may be used, including adhesives, heat sealing, ultrasonic welding, or even snap fitting the two sections together. Another alternative would be to mold base 12 in with battery cover 30 and then secure cap 11 to base 12.

While the above discussion has been directed toward vent systems for batteries wherein the plug assembly is threaded into its respective vent well, it can be appreciated that the concepts taught and inventions claimed also apply to a vent system wherein the vent plug has no threads and can be press fitted into the well. It can also be appreciated that a series of these vent plugs can be secured together to form a multi-gang vent plug assembly. While further modification of the battery cover would be required so that the multi-gang vent plug assembly would be flush with the cover, the connection of a plurality of vent plugs of either embodiment would be within the capabilities of one skilled in the art.

A further consideration which should be noted is that the concepts embodying the invention disclosed and claimed herein, while primarily applicable to batteries, may also be applicable to vent systems in other environments having similar venting requirements, such as in venting hydrocarbons.

While particular embodiments of this invention have been shown and described, it is obvious that changes and modifications can be made without departing from the true spirit and scope of the invention. It is the intention in the appended claims to cover all such changes and modifications.

We claim:

1. A vent plug for insertion into a vent well of an individual cell of a battery, wherein said vent plug is designed to separate the gaseous and liquid phases of the fluid passing through it from the particular battery cell, said vent plug comprising:
    a. a body portion for insertion into the vent well, said body portion having a predetermined length;
    b. a bottom portion connected to the lower portion of the body portion;
    c. at least one drain opening located in or near the bottom portion;

d. cap means secured over the upper portion of the body portion, thereby defining an internal enclosure inside the body portion;

e. inlet means for directing fluid flow from the battery cell into the internal enclosure in a horizontal direction and at a point above the drain opening;

f. discharge port means located in the upper portion of the vent plug, for permitting fluid within the internal enclosure to enter the atmosphere; and g. vertical baffle means having at least a portion of said means opposite the inlet means, so that as fluid flows into the vent plug enclosure through the inlet opening its flow is diverted by said baffle means, thereby causing the liquid phase of the fluid to be separated from the gaseous phase, with the gaseous phase entering the atmosphere through the discharge port means and the liquid phase returning to the particular cell through the drain opening.

2. The vent plug recited in claim 1, wherein the baffle means comprises a baffle extending from the bottom portion a predetermined height and having a T-shaped horizontal cross-section.

3. The vent plug recited in claim 2, wherein the vertical edge of the base of the T-shaped baffle is closest to the inlet means and aligned so that part of the incoming fluid flow contacts each of the upper arms of the T-shaped baffle.

4. The vent plug recited in claim 3, wherein predetermined height of the T-shaped baffle places the top of said baffle above the level of the inlet means.

5. The vent plug recited in claim 4, further comprising at least one diagonal, vertical baffle extending from the bottom portion and the inside sidewall of the body portion diagonally toward the T-shaped baffle so that the fluid not deflected by the arms of the T-shaped baffle is deflected and that already deflected is further deflected.

6. The vent plug recited in claim 5, wherein the number of diagonal baffles is two, one on each side of the T-shaped baffle and extending toward the base of the T-shaped baffle.

7. The vent plug recited in claim 6 wherein each drain opening is arranged so that any fluid flowing into the vent plug through this drain opening contacts a diagonal baffle.

8. The vent plug recited in claim 7, wherein the inlet means includes a horizontal, elongated passage at the point of entry to the internal enclosure.

9. The vent plug recited in claim 8, wherein the inlet means includes a horizontal, elongated passage extending from an entrance point in the sidewall of the body portion above the drain opening, to the internal enclosure.

10. The vent plug recited in claim 9, wherein the bottom portion is inclined so that the drain opening is at or near the lowermost portion of the bottom portion.

11. The vent plug recited in claim 10, wherein the space between the T-shaped baffle and the diagonal baffles is large enough to permit the flow of collected electrolyte therethrough, down the bottom portion to the drain opening.

12. The vent plug recited in claim 11, wherein the entrance point is at the highest point along the sidewall of the body portion, which still remains in the battery cell.

13. The vent plug recited in claim 1, wherein the inlet means includes a horizontal, elongated passage at the point of entry to the internal enclosure.

14. The vent plug recited in claim 13, wherein the inlet means includes a horizontal, elongated passage extending from an entrance point in the sidewall of the body portion above the drain opening, to the internal enclosure.

15. The vent plug recited in claim 14, wherein the entrance point is at the highest point along the sidewall of the body portion, which still remains in the battery cell.

16. A vent system for use on the top of a container to separate the gaseous and liquid phases of fluid passing through it, from the container enclosure to the atmosphere, said vent system comprising:

a. a body portion which extends into the container enclosure a predetermined distance;

b. a bottom portion connected to the lower portion of the body portion;

c. at least one drain opening located in or near the bottom portion;

d. cap means covering the upper portion of the body portion, thereby defining a vent system internal enclosure inside the body portion;

e. inlet means for directing fluid flow from the container enclosure into the vent system internal enclosure in a horizontal direction and at a level above the drain opening;

f. discharge port means located in the upper portion of the vent system, for permitting fluid within the internal enclosure to enter the atmosphere; and g. vertical baffle means having at least a portion of said means positioned opposite the inlet means, so that as fluid flows into the vent system internal enclosure through the inlet opening its flow is diverted by said baffle means, thereby causing the liquid phase of the fluid to be separated from the gaseous phase, with the gaseous phase entering the atmosphere through the discharge port means and the liquid phase returning to the container enclosure through the drain opening.

17. The vent system recited in claim 16, wherein the inlet means includes a horizontal, elongated passage at the point of entry to the vent system internal enclosure.

18. The vent system recited in claim 17, wherein the inlet means includes a horizontal, elongated passage extending from an entrance point in the sidewall of the body portion above the drain opening, to the vent system internal enclosure.

19. The vent system recited in claim 18, wherein the entrance point is at the highest point along the sidewall of the body portion, which still remains inside the enclosed container.

* * * * *